(12) United States Patent
Higashi et al.

(10) Patent No.: US 9,972,840 B2
(45) Date of Patent: May 15, 2018

(54) TITANIUM OXIDE COMPOUND, AND ELECTRODE AND LITHIUM ION SECONDARY BATTERY EACH MANUFACTURED USING SAME

(71) Applicant: KUBOTA Corporation, Osaka-shi, Osaka (JP)

(72) Inventors: Kenji Higashi, Amagasaki (JP); Hiroshi Okumura, Amagasaki (JP); Yoshiyuki Hirono, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 332 days.

(21) Appl. No.: 14/774,315

(22) PCT Filed: Mar. 24, 2014

(86) PCT No.: PCT/JP2014/057963
§ 371 (c)(1),
(2) Date: Sep. 10, 2015

(87) PCT Pub. No.: WO2014/157024
PCT Pub. Date: Oct. 2, 2014

(65) Prior Publication Data
US 2016/0043393 A1    Feb. 11, 2016

(30) Foreign Application Priority Data
Mar. 29, 2013  (JP) .................................. 2013-071042

(51) Int. Cl.
*H01M 4/48* (2010.01)
*C01G 23/00* (2006.01)
(Continued)

(52) U.S. Cl.
CPC ............ *H01M 4/48* (2013.01); *C01G 23/005* (2013.01); *C01G 23/04* (2013.01); *C01G 23/047* (2013.01);
(Continued)

(58) Field of Classification Search
CPC .. C01G 23/047; C01G 23/007; C01G 23/043; C01G 23/00
See application file for complete search history.

(56) References Cited

U.S. PATENT DOCUMENTS

2006/0110318 A1* 5/2006 Torardi ................. B82Y 30/00
                                                            423/610
2007/0175365 A1* 8/2007 Drews-Nicolai ...... C01G 23/07
                                                            106/446
(Continued)

FOREIGN PATENT DOCUMENTS

JP    2008-117625 A    5/2008
JP    2011-048947 A    3/2011
JP    2011-173761 A    9/2011

OTHER PUBLICATIONS

Official Communication issued in International Patent Application No. PCT/JP2014/057963, dated Jun. 24, 2014.
(Continued)

*Primary Examiner* — Jeremiah R Smith
(74) *Attorney, Agent, or Firm* — Keating and Bennett, LLP

(57) ABSTRACT

A titanium oxide compound according to the present invention comprises bronze-type titanium oxide or titanium oxide mainly composed of bronze-type titanium oxide, and contains calcium and/or silicon. The titanium oxide compound contains 0.005 to 2.5 mass % inclusive of calcium or 0.15 to 0.55 mass % inclusive of silicon, or contains 0.005 to 1.2 mass % inclusive of calcium and 0.15 to 0.2 mass %
(Continued)

inclusive of silicon, or contains 0.005 to 0.1 mass % inclusive of calcium and 0.15 to 0.5 mass % inclusive of silicon.

10 Claims, 9 Drawing Sheets

(51) Int. Cl.
    *C01G 23/04*       (2006.01)
    *C01G 23/047*     (2006.01)
    *H01M 10/0525*    (2010.01)
    *H01M 4/36*       (2006.01)
    *H01M 4/485*      (2010.01)
    *H01M 4/131*      (2010.01)
    *H01M 10/052*     (2010.01)

(52) U.S. Cl.
CPC ...... *H01M 10/0525* (2013.01); *C01G 23/007* (2013.01); *C01G 23/043* (2013.01); *C01P 2002/50* (2013.01); *C01P 2002/52* (2013.01); *C01P 2002/72* (2013.01); *C01P 2004/03* (2013.01); *C01P 2004/54* (2013.01); *C01P 2006/12* (2013.01); *C01P 2006/14* (2013.01); *C01P 2006/16* (2013.01); *C01P 2006/40* (2013.01); *H01M 4/131* (2013.01); *H01M 4/36* (2013.01); *H01M 4/362* (2013.01); *H01M 4/364* (2013.01); *H01M 4/485* (2013.01); *H01M 10/052* (2013.01)

(56) References Cited

U.S. PATENT DOCUMENTS

| | | | | |
|---|---|---|---|---|
| 2007/0292760 A1* | 12/2007 | Patoux | ................ | H01M 4/485 |
| | | | | 429/223 |
| 2010/0180991 A1* | 7/2010 | Heritier | ................ | C22C 14/00 |
| | | | | 148/669 |
| 2011/0052994 A1* | 3/2011 | Harada | ................ | C01G 23/001 |
| | | | | 429/231.5 |
| 2011/0206991 A1* | 8/2011 | Nakahara | ................ | C01B 25/00 |
| | | | | 429/231.5 |
| 2012/0184433 A1* | 7/2012 | Yang | ................ | B01J 21/063 |
| | | | | 502/439 |
| 2013/0161558 A1* | 6/2013 | Kawamura | ................ | H01M 4/485 |
| | | | | 252/182.1 |
| 2015/0287983 A1* | 10/2015 | Yokouchi | ................ | H01M 4/131 |
| | | | | 429/231.1 |

OTHER PUBLICATIONS

Brousse et al., "TiO2 (B)/activated carbon non-aqueous hybrid system for energy storage", Journal of Power Sources, 158, Nov. 8, 2005, pp. 571-577.

Liu et al., "Mesoporous TiO2-B Microspheres with Superior Rate Performance for Lithium Ion Batteries", Advanced Materials, 2011, 23 pp. 3450-3454.

Zhang, J.; "Preparation and Gas Sensitivities of Monoclinic TiO2"; Journal of the Chinese Ceramic Society; vol. 39 No. 3; Mar. 2011 pp. 470-474.

Wang, J.; "The Research on the Photocatalytic Properties of Metal-ion Modified TiO2"; A Thesis Submitted to Zhejiang University for the Degree of Master of Science; 2013; 91 pages.

* cited by examiner

Fig. 4A

| | Ca CONTENT [wt%] | ASPECT RATIO | AVERAGE PORE DIAMETER [μm] | SPECIFIC SURFACE AREA [m²/g] | PORE VOLUME [cm³/g] | INITIAL DISCHARGE CAPACITY [mAh/g] | INITIAL CHARGE CAPACITY [mAh/g] | INITIAL CHARGE/DISCHARGE EFFICIENCY[%] |
|---|---|---|---|---|---|---|---|---|
| COMPARATIVE EXAMPLE 1-1 | 0.003 | 7.41 | 60 | 15.40 | 0.231 | 188 | 235 | 80 |
| EXAMPLE 1-1 | 0.006 | 5.74 | 54 | 12.10 | 0.163 | 192 | 223 | 86 |
| EXAMPLE 1-2 | 0.11 | 4.58 | 43 | 9.38 | 0.100 | 190 | 213 | 89 |
| EXAMPLE 1-3 | 1.15 | 3.52 | 34 | 7.03 | 0.059 | 188 | 209 | 90 |
| EXAMPLE 1-4 | 2.37 | 3.28 | 30 | 4.52 | 0.034 | 185 | 203 | 91 |
| COMPARATIVE EXAMPLE 1-2 | 2.64 | 3.01 | 25 | 4.05 | 0.025 | 176 | 191 | 92 |

Fig. 5A

| | Si CONTENT [wt%] | ASPECT RATIO | AVERAGE PORE DIAMETER [μm] | SPECIFIC SURFACE AREA [m²/g] | PORE VOLUME [cm³/g] | INITIAL DISCHARGE CAPACITY [mAh/g] | INITIAL CHARGE CAPACITY [mAh/g] | INITIAL CHARGE/DISCHARGE EFFICIENCY[%] |
|---|---|---|---|---|---|---|---|---|
| COMPARATIVE EXAMPLE 2-1 | 0.02 | 7.41 | 60 | 15.40 | 0.231 | 188 | 235 | 80 |
| EXAMPLE 2-1 | 0.16 | 3.12 | 42 | 3.15 | 0.035 | 190 | 216 | 88 |
| EXAMPLE 2-2 | 0.20 | 2.89 | 44 | 2.64 | 0.029 | 189 | 210 | 90 |
| EXAMPLE 2-3 | 0.46 | 2.64 | 39 | 2.25 | 0.022 | 189 | 208 | 91 |
| EXAMPLE 2-4 | 0.54 | 2.55 | 38 | 2.04 | 0.019 | 186 | 204 | 91 |
| COMPARATIVE EXAMPLE 2-2 | 0.68 | 2.15 | 29 | 2.05 | 0.015 | 176 | 189 | 93 |

Fig. 6

| | Si CONTENT [wt%] | Ca CONTENT [wt%] | ASPECT RATIO | AVERAGE PORE DIAMETER [μm] | SPECIFIC SURFACE AREA [m²/g] | PORE VOLUME [cm³/g] | INITIAL DISCHARGE CAPACITY [mAh/g] | INITIAL CHARGE CAPACITY [mAh/g] | INITIAL CHARGE/DISCHARGE EFFICIENCY [%] |
|---|---|---|---|---|---|---|---|---|---|
| COMPARATIVE EXAMPLE 3-1 | 0.02 | 1.15 | 3.52 | 34 | 7.03 | 0.059 | 188 | 209 | 90 |
| EXAMPLE 3-1 | 0.19 | 1.050 | 2.85 | 39 | 2.05 | 0.020 | 191 | 210 | 91 |
| COMPARATIVE EXAMPLE 3-2 | 0.46 | 0.003 | 2.64 | 39 | 2.25 | 0.022 | 189 | 208 | 91 |
| EXAMPLE 3-2 | 0.46 | 0.045 | 2.34 | 32 | 2.03 | 0.016 | 192 | 211 | 91 |
| COMPARATIVE EXAMPLE 3-3 | 0.42 | 0.910 | 2.04 | 28 | 1.98 | 0.014 | 178 | 193 | 92 |

Fig. 7

|  | XRD d[Å] | |
|---|---|---|
| SURFACE INDEX | (200) | (-313) |
| COMPARATIVE EXAMPLE 1-1 | 8.73 | 2.65 |
| EXAMPLE 1-3 | 8.68 | 2.65 |
| EXAMPLE 2-1 | 8.68 | 2.65 |
| EXAMPLE 3-1 | 8.68 | 2.65 |

TITANIUM OXIDE COMPOUND, AND ELECTRODE AND LITHIUM ION SECONDARY BATTERY EACH MANUFACTURED USING SAME

TECHNICAL FIELD

The present invention relates to a titanium oxide compound, and more specifically to an electrode using the titanium oxide compound as an electrode active material, and a lithium ion secondary battery using the electrode as a positive electrode or a negative electrode.

BACKGROUND ART

Conventionally, a carbon material is generally used as a negative electrode of a lithium ion secondary battery. Recent years, it has been often reported that such a lithium ion secondary battery has produced abnormal heat and ignition (so-called thermal runaway). It is considered that an internal short circuit of the battery is one of causes of the thermal runaway described above. When the internal short circuit of the battery occurs, excessive inrush current flows to the negative electrode and causes heating of the negative electrode or other members.

As a cause of the internal short circuit, besides external impact, there is considered a breakage of a separator by a column-like metal lithium crystal (dendrite) deposited on a surface of the negative electrode. In a lithium ion secondary battery using a carbon material as the negative electrode, the above-mentioned metal lithium crystal is apt to be deposited because the potential of the negative electrode is low like 0.08 V (vs. Li).

On the other hand, it is also known to use spinel type lithium titanate (S-LTO) besides the above-mentioned carbon material as the negative electrode of the lithium ion secondary battery. In the lithium ion secondary battery using this negative electrode, the potential of the negative electrode is raised to 1.55 V (vs. Li), and hence the metal lithium crystal is hardly deposited on a surface of the negative electrode. As a result, risk of the internal short circuit can be reduced, but there is a drawback that the negative electrode geometric capacity is only 175 mAh/g (carbon material has 372 mAh/g).

In addition, it is also proposed to use a bronze-type titanium oxide compound as the negative electrode of the lithium ion secondary battery (see, for example, Patent Document 1). In the lithium ion secondary battery using this negative electrode, the potential of the negative electrode is raised close to 1.5 V (vs. Li) similarly to a case of using S-LTO, and hence the metal lithium crystal is hardly deposited on a surface of the negative electrode. As a result, risk of the internal short circuit can be reduced, and in addition, the negative electrode geometric capacity can be increased to 335 mAh/g compared with the case of using S-LTO.

PRIOR ART DOCUMENTS

Patent Document 1: JP-A-2008-117625
Non-Patent Document 1: T. Brousse, R. Marchand, P. -L. Taberna, P. Simon, J. Power Sources, 158, 571-577 (2006)

DISCLOSURE OF THE INVENTION

Problem to be Solved by the Invention

However, the bronze-type titanium oxide compound synthesized from $K_2Ti_4O_9$ forms needle crystals having a large specific surface area and is apt to react with electrolytic solution. For this reason, the lithium ion secondary battery using this electrode active material has a problem that initial charge/discharge efficiency (=(initial discharge capacity)/(initial charge capacity)×100(%)) is low (see Non-Patent Document 1).

As for this problem, in Patent Document 1, for example, an isotropic bronze-type titanium oxide compound is manufactured from a mixture of a sodium compound and titanium oxide so that the initial charge/discharge efficiency is improved. However, there occurs a new problem that the initial charge capacity of the electrode active material of Patent Document 1 is decreased to approximately 170 mAh/g similarly to S-LTO so that a merit of using the bronze-type titanium oxide compound is lost.

In view of the above-mentioned problem, it is an object of the present invention to provide a titanium oxide compound that can be used as an electrode active material having a high capacity and a high initial charge/discharge efficiency with a small specific surface area by controlling the particle shape to be like a plate, and to provide an electrode and a lithium ion secondary battery using the titanium oxide compound.

Means for Solving the Problem

In order to achieve the above-mentioned object, a titanium oxide compound according to one aspect of the present invention is bronze-type titanium oxide or titanium oxide mainly composed of bronze-type titanium oxide, and contains 0.005 to 2.5 mass % inclusive of calcium (first structure).

In order to achieve the above-mentioned object, a titanium oxide compound according to another aspect of the present invention is bronze-type titanium oxide or titanium oxide mainly composed of bronze-type titanium oxide, and contains 0.15 to 0.55 mass % inclusive of silicon (second structure).

In order to achieve the above-mentioned object, a titanium oxide compound according to still another aspect of the present invention is bronze-type titanium oxide or titanium oxide mainly composed of bronze-type titanium oxide, and contains 0.005 to 1.2 mass % inclusive of calcium and 0.15 to 0.2 mass % inclusive of silicon, or contains 0.005 to 0.1 mass % inclusive of calcium and 0.15 to 0.5 mass % inclusive of silicon (third structure).

In addition, it is preferred in the titanium oxide compound according to the present invention having any one of the above-mentioned first to third structures, at least a part of the calcium and/or at least a part of the silicon exists as a solid solution in a titanium oxide crystals (fourth structure). Further, it is preferred that the pore volume is 0.01 to 0.5 mL/g, and the specific surface area is 1.0 to 20 m²/g (fifth structure).

In addition, an electrode according to the present invention is configured to use the titanium oxide compound according to any one of the first to fifth structures as electrode active material (sixth structure).

In addition, a lithium ion secondary battery according to the present invention is configured to use the electrode according to the sixth structure as a positive electrode or a negative electrode (seventh structure).

Effects of the Invention

According to the present invention, it is possible to provide a titanium oxide compound that can be used as an electrode active material having a high initial charge/discharge efficiency by decreasing the specific surface area without producing raw material in a specific chemical composition or changing a sintering condition such as changing sintering temperature during a production process, and to provide an electrode and a lithium ion secondary battery using the titanium oxide compound. In addition, because the specific surface area is decreased, it is also expected that viscosity is hardly increased so that coatability is improved when the electrode slurry is manufactured.

BRIEF DESCRIPTION OF THE DRAWINGS

FIG. 4A is a table showing evaluation results of Examples 1-1 to 1-4 and Comparative Examples 1-1 to 1-2.

FIG. 5A is a table showing evaluation results of Examples 2-1 to 2-4 and Comparative Examples 2-1 to 2-2.

FIG. 6 is a table showing evaluation results of Examples 3-1 to 3-2 and Comparative Examples 3-1 to 3-3.

FIG. 7 is a table showing X-ray diffraction measurement results of potassium tetratitanate.

DESCRIPTION OF EMBODIMENTS

<First Embodiment>
(Outline)
A titanium oxide compound according to a first embodiment of the present invention is bronze-type titanium oxide or titanium oxide mainly composed of bronze-type titanium oxide, and contains 0.005 to 2.5 mass % inclusive of calcium. As the titanium oxide mainly composed of bronze-type titanium oxide, there is, for example, titanium oxide that is mainly composed of bronze-type titanium oxide and contains a very small quantity of anatase type, rutile type, or hydrous titanium oxide. If the bronze-type titanium oxide is contained at 60 mass % or more, the titanium oxide compound having similar effect can be obtained, but it is more preferred that the bronze-type titanium oxide is contained at 80 mass % or more, and it is still more preferred that the bronze-type titanium oxide is contained at 90 mass % or more.

Figure 1:
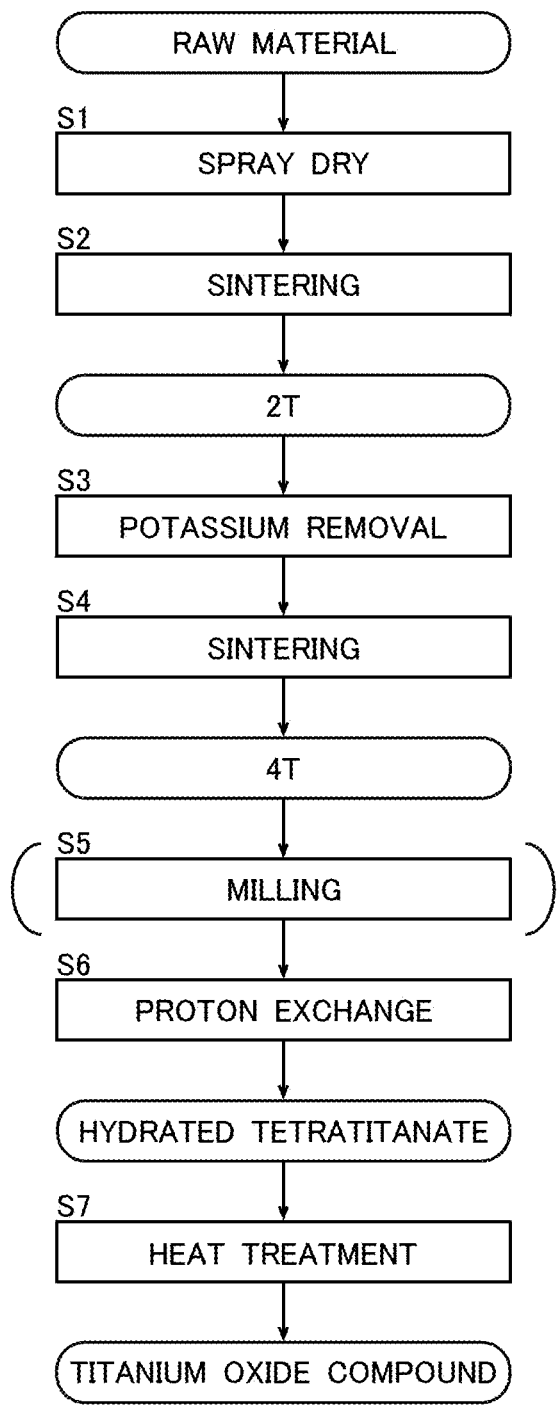
FIG. 1 is a flowchart showing an example of a process for manufacturing a titanium oxide compound according to the present invention.

(Example of Manufacturing Method)
FIG. 1 is a flowchart showing an example of a schematic process for manufacturing the titanium oxide compound according to the present invention. In the manufacturing method shown in FIG. 1, mixed solution of titanium dioxide ($TiO_2$) and potassium carbonate ($K_2CO_3$) mixed at a predetermined composition ratio is first made to undergo a spray dry process (Step S1) and sintering process (Step S2) so as to synthesize potassium dititanate ($K_2Ti_2O_5$).

Next, the above-mentioned potassium dititanate is made to undergo potassium removal process (Step S3) and sintering process (Step S4) so as to convert $TiO_5$ trigonal bipyramid structure into $TiO_6$ octahedron structure, and thus synthesize potassium tetratitanate ($K_2Ti_4O_9$). In other words, this potassium tetratitanate is obtained by eluting a part of potassium ions of the potassium dititanate expressed by general formula $K_2Ti_2O_5$ for compositional conversion and then by performing the sintering process.

Further, the above-mentioned potassium tetratitanate is made to undergo milling process (that can be eliminated) (Step S5) and proton exchange process (Step S6) so as to synthesize hydrated tetratitanate compound ($H_2Ti_4O_9 \cdot nH_2O$). Then, the hydrated tetratitanate compound is made to undergo heat treatment at 200 to 550° C. (Step S7) so as to synthesize titanium oxide compound.

The manufacturing method shown in FIG. 1 is merely an example of the manufacturing method of the titanium oxide compound according to the present invention. The titanium oxide compound according to the present invention may be manufactured by a method other than the manufacturing method shown in FIG. 1. For instance, in the manufacturing method shown in FIG. 1, the method of synthesizing the potassium dititanate ($K_2Ti_2O_5$) may be changed to a method in which a mixture of the titanium dioxide ($TiO_2$) and the potassium carbonate ($K_2CO_3$) mixed at a predetermined composition ratio is made to undergo melting process and solidification process so as to synthesize the potassium dititanate ($K_2Ti_2O_5$).

Figure 2:
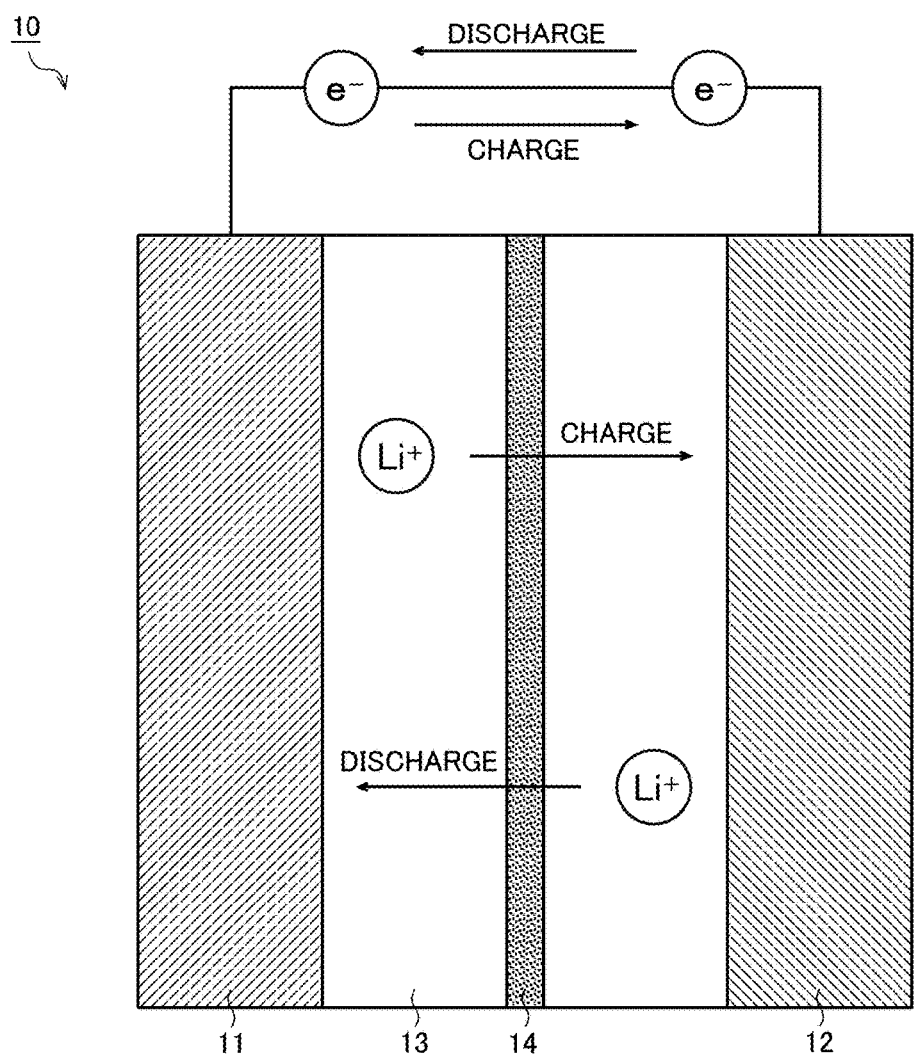
FIG. 2 is a schematic diagram showing an outline structure of a lithium ion secondary battery.

(Application to Lithium Ion Secondary Battery)
FIG. 2 is a schematic diagram showing an outline structure of a lithium ion secondary battery. A lithium ion secondary battery 10 of this structural example includes a positive electrode 11, a negative electrode 12, a nonaqueous electrolyte 13, and a separator 14.

The positive electrode 11 has a structure in which a positive electrode mix layer is disposed on one or both surfaces of the positive electrode current collector, for example. The positive electrode mix layer contains, for example, a positive electrode material that can absorb and desorb lithium as a positive electrode active material, and if necessary, a conducting agent such as carbon black or graphite and a binding agent such as polyvinylidene fluoride.

The negative electrode 12 has a structure in which a negative electrode mix layer is disposed on one or both surfaces of the negative electrode current collector, for example. The negative electrode mix layer may contain, in addition to a negative electrode material according to this embodiment (namely, the above-mentioned titanium oxide compound according to this embodiment), other negative electrode active material, a conducting agent, and the like.

The nonaqueous electrolyte 13 may be a liquid nonaqueous electrolyte prepared by dissolving an electrolyte (lithium salt) in an organic solvent or a gel nonaqueous electrolyte in which a liquid electrolyte and a polymer material are composited. As the electrolyte, there are, for example, $LiClO_4$, $LiPF_6$, $LiBF_4$, and the like, and any one or more of them can be mixed in use. In addition, as the organic solvent, there are, for example, propylene carbonate, ethylene carbonate, diethyl carbonate, dimethyl carbonate, 1,2-dimethoxyethane, and the like, and any one or more of them can be mixed in use.

The separator 14 isolates the positive electrode 11 from the negative electrode 12 so as to prevent a short circuit of current due to contact between the positive electrode and the negative electrode, while allows lithium ions to pass through. This separator 14 is made of, for example, a porous membrane of a synthetic resin such as polytetrafuoroethane, polypropylene, or polyethylene or a porous membrane of an inorganic material such as ceramic nonwoven fabric, and may have a structure in which two or more of these porous membranes are laminated.

As described above, by using not a carbon material but the negative electrode material according to this embodiment (the above-mentioned titanium oxide compound according to this embodiment) as the negative electrode 12 of the lithium ion secondary battery 10, it is possible to increase safety of the lithium ion secondary battery 10 by a threefold mechanism described below.

First, there is a merit that the internal short circuit due to the dendrite deposition hardly occurs. When a carbon negative electrode is used, the potential of the negative electrode is low, and the dendrite deposition ($Li^+ + e^-$ to Li) is apt to occur. On the other hand, when the titanium oxide compound negative electrode is used, the potential of the negative electrode is high, and does not reach dendrite deposition potential.

Secondly, there is a merit that heating when the internal short circuit occurs can be suppressed. The titanium oxide compound is changed to have insulation property in a state where the lithium ions are completely removed. Accordingly, a surface of the titanium oxide compound at the short circuit location is insulated so as to suppress discharge reaction. In other words, in a general lithium ion secondary battery using a carbon negative electrode, rapid discharge (heating) occurs when the internal short circuit occurs. In contrast, in the lithium ion secondary battery using the titanium oxide compound negative electrode, discharge proceeds slowly so that temperature does not increase so much.

Thirdly, there is a merit that thermal stability is high. The titanium oxide compound has very little possibility to cause thermal runaway triggered by reaction with the electrolytic solution. In addition, titanium oxide compound is not burned unlike carbon, and hence possibility to reach the ignition from the thermal runaway is also very low.

Further, by using the negative electrode material according to this embodiment (the above-mentioned titanium oxide compound according to this embodiment), as being clear from Examples and Comparative Examples of this embodiment described later, initial charge/discharge efficiency can be increased while maintaining higher capacity of the lithium ion secondary battery 10.

Hereinafter, Examples of this embodiment are described in more detail, but this embodiment is not limited to the Examples described below. In other words, it is needless to say that a part to which a known general method can apply, such as various process methods described below and a milling method, can be appropriately changed without limited to the Examples described below.

EXAMPLE 1-1

After mixing 26.2 weight parts of titanium oxide ($TiO_2$) containing 0.01 mass % of calcium (Ca) to 100 weight parts of water, the mixture was stirred for 30 minutes. After that, 23.8 weight parts of potassium carbonate ($K_2CO_3$) was added, and the mixture was stirred further for one hour. The mixed solution was spray dried at 200° C., and was heat treated at 800° C. for three hours, so as to synthesize the potassium dititanate ($K_2Ti_2O_5$).

The potassium dititanate obtained by the synthesis described above was soaked in water and then stirred by a mixer for two hours for removing potassium. After removing supernatant liquid, dehydration was performed using a vacuum filter. Then, after drying at 120° C. during one night, heat treatment was performed at 850° C. for two hours, so that potassium tetratitanate ($K_2Ti_4O_9$) was synthesized.

The potassium tetratitanate obtained by the synthesis described above was added to 0.5 M sulfuric acid solution and was stirred for two hours for removing potassium. After removing supernatant liquid, dehydration was performed using the vacuum filter. Then, by heat treatment at 450° C. for one hour, the titanium oxide compound was synthesized.

The content of calcium in the obtained titanium oxide compound was 0.006 mass % as a result of inductively coupled plasma emission spectro-photometric analysis.

In addition, the average aspect ratio of the primary particles of the obtained titanium oxide compound (average value of aspect ratios of arbitrary 100 primary particles observed by an scanning electron microscope) was 5.74, the average pore diameter was 54 μm, the BET specific surface area was 12.10 $m^2/g$, and the pore volume was 0.163 $cm^3/g$. In addition, the X-ray diffraction spectrum (X-ray source: Cu—Kα) of the obtained titanium oxide compound was that indicating bronze-type titanium oxide having a tunnel structure.

EXAMPLE 1-2

Except that titanium oxide containing calcium at 0.15 mass % was used, the same process as Example 1-1 was used so as to synthesize the titanium oxide compound.

The content of calcium in the obtained titanium oxide compound was 0.11 mass % as a result of the inductively coupled plasma emission spectro-photometric analysis.

In addition, the average aspect ratio of the primary particles of the obtained titanium oxide compound was 4.58, the average pore diameter was 43 μm, the BET specific surface area was 9.38 $m^2/g$, and the pore volume was 0.100 $cm^3/g$. In addition, the X-ray diffraction spectrum (X-ray source: Cu—Kα) of the obtained titanium oxide compound was that indicating bronze-type titanium oxide having the tunnel structure.

EXAMPLE 1-3

Except that 26.2 weight parts of titanium oxide and 3.94 weight parts of calcium carbonate were mixed to 100 weight parts water and were stirred for 30 minutes, the same process as Example 1-1 was used so as to synthesize the titanium oxide compound.

The content of calcium in the obtained titanium oxide compound was 1.15 mass % as a result of the inductively coupled plasma emission spectro-photometric analysis.

In addition, the average aspect ratio of the primary particles of the obtained titanium oxide compound was 3.52, the average pore diameter was 34 μm, the BET specific surface area was 7.03 $m^2/g$, and the pore volume was 0.059 $cm^3/g$. In addition, the X-ray diffraction spectrum (X-ray source: Cu—Kα) of the obtained titanium oxide compound was that indicating bronze-type titanium oxide having the tunnel structure.

EXAMPLE 1-4

Except that the mixed amount of calcium carbonate was 6.57 weight parts, the same process as Example 1-3 was used so as to synthesize the titanium oxide compound.

The content of calcium in the obtained titanium oxide compound was 2.37 mass % as a result of the inductively coupled plasma emission spectro-photometric analysis.

In addition, the average aspect ratio of the primary particles of the obtained titanium oxide compound was 3.28, the average pore diameter was 30 μm, the BET specific surface area was 4.52 m²/g, and the pore volume was 0.034 cm³/g. In addition, the X-ray diffraction spectrum (X-ray source: Cu—Kα) of the obtained titanium oxide compound was that indicating bronze-type titanium oxide having the tunnel structure.

Comparative Example 1-1

Except that titanium oxide containing calcium at 0.003 mass % was used, the same process as Example 1-1 was used so as to synthesize the titanium oxide compound.

The content of calcium in the obtained titanium oxide compound was 0.003 mass % as a result of the inductively coupled plasma emission spectro-photometric analysis.

In addition, the average aspect ratio of the primary particles of the obtained titanium oxide compound was 7.41, the average pore diameter was 60 μm, the BET specific surface area was 15.40 m²/g, and the pore volume was 0.231 cm³/g. In addition, the X-ray diffraction spectrum (X-ray source: Cu—Kα) of the obtained titanium oxide compound was that indicating bronze-type titanium oxide having the tunnel structure.

Comparative Example 1-2

Except that the mixed amount of calcium carbonate was 9.04 weight parts, the same process as Example 1-3 was used so as to synthesize the titanium oxide compound.

The content of calcium in the obtained titanium oxide compound was 2.64 mass % as a result of the inductively coupled plasma emission spectro-photometric analysis.

In addition, the average aspect ratio of the primary particles of the obtained titanium oxide compound was 3.01, the average pore diameter was 25 μm, the BET specific surface area was 4.05 m²/g, and the pore volume was 0.025 cm³/g. In addition, the X-ray diffraction spectrum (X-ray source: Cu—Kα) of the obtained titanium oxide compound was that indicating bronze-type titanium oxide having the tunnel structure.

(Analyzing Apparatus)

The analyzing apparatuses used in Examples 1-1 to 1-4 and Comparative Examples 1-1 to 1-2 described above are as follows.

The inductively coupled plasma emission spectro-photometric analysis apparatus: ICPS-8100 manufactured by SHIMADZU CORPORATION The average pore diameter, BET specific surface area, and pore volume measuring apparatus: BELSORP-miniII manufactured by BEL Japan Inc.

X-ray diffraction apparatus: Ultima4 manufactured by Rigaku Corporation, measurement by Cu—Kα radiation (Manufacturing of Electrodes)

Electrodes were manufactured using the titanium oxide compound synthesized in Examples 1-1 to 1-4 and Comparative Examples 1-1 to 1-2 as the active material. Specifically, 10 weight parts of polyvinylidene fluoride was first dissolved in N-methyl-2-pyrrolidone, then 20 weight parts of conductive carbon was added as a conduction supporting agent, 70 weight parts of the titanium oxide compound obtained in Examples 1-1 to 1-4 and Comparative Examples 1-1 to 1-2 is added, and a planetary mixer was used for kneading them so that paint was manufactured. This paint was coated on aluminum foil to be approximately 40 g/m².

After that, vacuum drying at 120° C. and pressing were performed, and then a disk of 013 mm was punched.

(Assembly of Cell)

Figure 3:
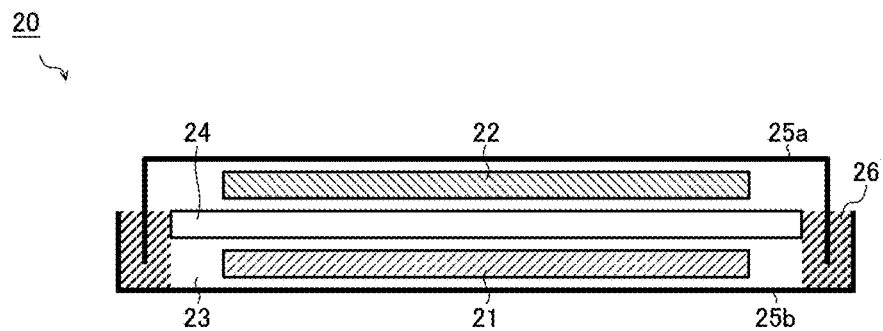
FIG. 3 is a schematic diagram of a coin cell that is used for evaluating battery performance.

Using the above-mentioned manufactured electrodes, coin cells 20 shown in FIG. 3 were assembled. The coin cell 20 was manufactured by the steps of sandwiching an electrode 21, an opposite electrode 22, a nonaqueous electrolyte 23, and a separator 24 between an upper case 25a and a lower case 25b, and sealing rims of the upper case 25a and the lower case 25b with a gasket 26.

Metal lithium foil was used as the opposite electrode 22. As the nonaqueous electrolyte 23, 1 mol/L of $LiPF_6$ was dissolved in ethylene carbonate and dimethyl carbonate at 1:1 v/v % and was used. A polypropylene porous membrane was used as the separator 24.

(Battery Evaluation Method)

Here, in the coin cell described above, because metal lithium is used for the opposite electrode, the potential of each electrode is higher than the opposite electrode. Accordingly, the direction of insertion/extraction of lithium ions due to charge and discharge is opposite to the case where each electrode is used as a negative electrode of the lithium ion secondary battery. However, in the following description, the direction in which the lithium ions are extracted from the target electrode is referred to as a discharge direction, and the direction in which the lithium ions are inserted into each electrode is referred to as a charging direction, for convenience sake.

The coin cell 20 described above was charged at a charging rate of 0.2 C at 25° C. up to 1.4 V with respect to the metal lithium, and then was discharged at a discharging rate of 0.2 C at room temperature down to 3.0 V with respect to the metal lithium, so that the initial discharge capacity, the initial charge capacity, and the initial charge/discharge efficiency were measured.

Evaluation Result of Examples and Comparative Examples

FIG. 4A is a table showing a list of evaluation results of Examples 1-1 to 1-4 and Comparative Examples 1-1 to 1-2 of this embodiment.

Figure 4B:
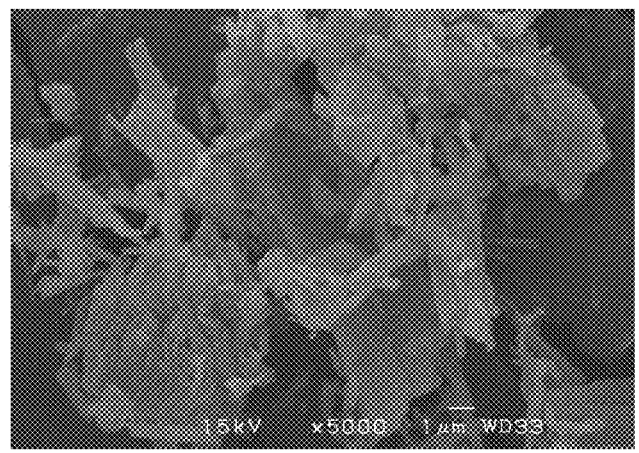
FIG. 4B is a scanning electron micrograph of the titanium oxide compound of Example 1-3.
Figure 4C:
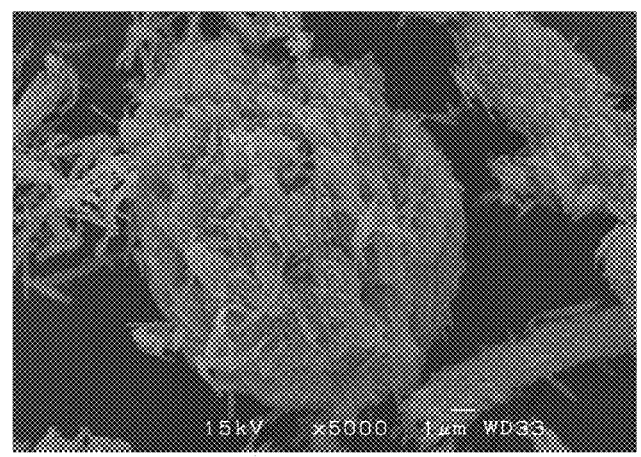
FIG. 4C is a scanning electron micrograph of the titanium oxide compound of Comparative Example 1-1.

As clear from comparison between Examples 1-1 to 1-4 and Comparative Examples 1-1, if the content of calcium in the titanate compound is 0.005 mass % or more, the initial charge/discharge efficiency can be approximately 86% or higher so that the initial charge/discharge efficiency is improved. The reason of this is considered that general bronze-type titanium oxide (e.g., Comparative Example 1-1) has needle crystals, while if the content of calcium is 0.005 mass % or more like Examples 1-1 to 1-4, the crystals become plate-like crystals. In other words, the average aspect ratio of the primary particles decreases, and the specific surface area is decreased due to a difference of crystal shape so that reaction with the electrolytic solution can be suppressed. As a result, the initial charge/discharge efficiency is improved. Note that a scanning electron micrograph of the titanium oxide compound of Example 1-3 is shown in FIG. 4B, and a scanning electron micrograph of the titanium oxide compound of Comparative Example 1-1 is shown in FIG. 4C.

In addition, as clear from comparison between Example 1-4 and Comparative Example 1-2, if the content of calcium is 2.5 mass % or less, the initial discharge capacity can be approximately 185 mAh/g or higher and the initial charge capacity can be approximately 203 mAh/g or higher, so that the initial discharge capacity and the initial charge capacity can be prevented from being decreased. The reason of this is considered that if the content of calcium is more than 2.5 mass %, deposition of a by-product such as calcium titanate or bad influence to a crystal phase is increased, and as a result, the initial discharge capacity and the initial charge capacity are decreased.

It is preferred that the content of calcium be 0.1 to 1.2 mass % inclusive. In this way, the initial charge/discharge efficiency can be substantially 90%, and a decrease of the initial discharge capacity can be substantially suppressed.

<Second Embodiment>

(Outline)

A titanium oxide compound according to a second embodiment of the present invention is bronze-type titanium oxide or titanium oxide mainly composed of bronze-type titanium oxide, and contains 0.15 to 0.55 mass % inclusive of silicon. As the titanium oxide mainly composed of bronze-type titanium oxide, there is, for example, titanium oxide that is mainly composed of bronze-type titanium oxide and contains a very small quantity of anatase type, rutile type, or hydrous titanium oxide. If the bronze-type titanium oxide is contained at 60 mass % or more, the titanium oxide compound having similar effect can be obtained, but it is more preferred that the bronze-type titanium oxide is contained at 80 mass % or more, and it is still more preferred that the bronze-type titanium oxide is contained at 90 mass % or more.

(Example of Manufacturing Method)

The manufacturing method is similar to that of the first embodiment, and hence description thereof is omitted.

(Application to Lithium Ion Secondary Battery)

The application to the lithium ion secondary battery is similar to that of the first embodiment, and hence description thereof is omitted. Note that if not a carbon material but the negative electrode material according to this embodiment (the above-mentioned titanium oxide compound according to this embodiment) is used for the negative electrode 12 of the lithium ion secondary battery 10, the same effect as in the case where the negative electrode material according to the first embodiment is used can be obtained.

Hereinafter, Examples of this embodiment are described in more detail, but this embodiment is not limited to the Examples described below. In other words, it is needless to say that a part to which a known general method can apply, such as various process methods described below and a milling method, can be appropriately changed without limited to the Examples described below.

EXAMPLE 2-1

Except that 26.2 weight parts of titanium oxide and 1.58 weight parts of silicon dioxide instead of calcium carbonate are mixed to 100 weight parts of water, and the mixture was stirred for 30 minutes, the same process as Example 1-3 was used so as to synthesize the titanium oxide compound.

The content of silicon in the obtained titanium oxide compound was 0.16 mass % as a result of the inductively coupled plasma emission spectro-photometric analysis.

In addition, the average aspect ratio of the primary particles of the obtained titanium oxide compound was 3.12, the average pore diameter was 42 μm, the BET specific surface area was 3.15 m$^2$/g, and the pore volume was 0.035 cm$^3$/g. In addition, the X-ray diffraction spectrum (X-ray source: Cu—Kα) of the obtained titanium oxide compound was that indicating bronze-type titanium oxide having the tunnel structure.

EXAMPLE 2-2

Except that the mixed amount of silicon dioxide was 1.99 weight parts, the same process as Example 2-1 was used so as to synthesize the titanium oxide compound.

The content of silicon in the obtained titanium oxide compound was 0.20 mass % as a result of the inductively coupled plasma emission spectro-photometric analysis.

In addition, the average aspect ratio of the primary particles of the obtained titanium oxide compound was 2.89, the average pore diameter was 44 μm, the BET specific surface area was 2.64 m$^2$/g, and the pore volume was 0.029 cm$^3$/g. In addition, the X-ray diffraction spectrum (X-ray source: Cu—Kα) of the obtained titanium oxide compound was that indicating bronze-type titanium oxide having the tunnel structure.

EXAMPLE 2-3

Except that the mixed amount of silicon dioxide was 4.93 weight parts, the same process as Example 2-1 was used so as to synthesize the titanium oxide compound.

The content of silicon in the obtained titanium oxide compound was 0.46 mass % as a result of the inductively coupled plasma emission spectro-photometric analysis.

In addition, the average aspect ratio of the primary particles of the obtained titanium oxide compound was 2.64, the average pore diameter was 39 μm, the BET specific surface area was 2.25 m$^2$/g, and the pore volume was 0.022 cm$^3$/g. In addition, the X-ray diffraction spectrum (X-ray source: Cu—Kα) of the obtained titanium oxide compound was that indicating bronze-type titanium oxide having the tunnel structure.

EXAMPLE 2-4

Except that the mixed amount of silicon dioxide was 5.91 weight parts, the same process as Example 2-1 was used so as to synthesize the titanium oxide compound.

The content of silicon in the obtained titanium oxide compound was 0.54 mass % as a result of the inductively coupled plasma emission spectro-photometric analysis.

In addition, the average aspect ratio of the primary particles of the obtained titanium oxide compound was 2.55, the average pore diameter was 38 μm, the BET specific surface area was 2.04 m$^2$/g, and the pore volume was 0.019 cm$^3$/g. In addition, the X-ray diffraction spectrum (X-ray source: Cu—Kα) of the obtained titanium oxide compound was that indicating bronze-type titanium oxide having the tunnel structure.

Comparative Example 2-1

Except that titanium oxide containing 0.1 mass % of silicon was used while silicon dioxide was not mixed, the same process as Example 2-1 was used so as to synthesize the titanium oxide compound.

The content of silicon in the obtained titanium oxide compound was 0.02 mass % as a result of the inductively coupled plasma emission spectro-photometric analysis.

In addition, the average aspect ratio of the primary particles of the obtained titanium oxide compound was 7.41, the average pore diameter was 60 μm, the BET specific surface area was 15.40 m$^2$/g, and the pore volume was 0.231 cm$^3$/g. In addition, the X-ray diffraction spectrum (X-ray source: Cu—Kα) of the obtained titanium oxide compound was that indicating bronze-type titanium oxide having the tunnel structure.

Comparative Example 2-2

Except that the mixed amount of silicon dioxide was 6.77 weight parts, the same process as Example 2-1 was used so as to synthesize the titanium oxide compound.

The content of silicon in the obtained titanium oxide compound was 0.68 mass % as a result of the inductively coupled plasma emission spectro-photometric analysis.

In addition, the average aspect ratio of the primary particles of the obtained titanium oxide compound was 2.15, the average pore diameter was 29 μm, the BET specific surface area was 2.05 m$^2$/g, and the pore volume was 0.015 cm$^3$/g. In addition, the X-ray diffraction spectrum (X-ray source: Cu—Kα) of the obtained titanium oxide compound was that indicating bronze-type titanium oxide having the tunnel structure.

(Analyzing Apparatus)

The analyzing apparatuses used in Examples 2-1 to 2-4 and Comparative Examples 2-1 to 2-2 were the same as those in the first embodiment, and hence description thereof is omitted.

(Manufacturing of Electrodes)

Electrodes were manufactured similarly to the first embodiment, and hence description thereof is omitted.

(Battery Evaluation Method)

The battery evaluation method was the same as in the first embodiment, and hence description thereof is omitted.

(Evaluation Result of Examples and Comparative Example)

FIG. 5A is a table showing a list of evaluation results of Examples 2-1 to 2-4 and Comparative Examples 2-1 to 2-2 of this embodiment.

Figure 5B:
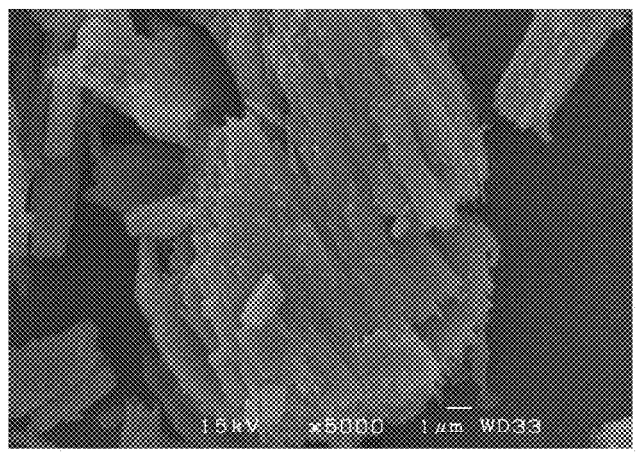
FIG. 5B is a scanning electron micrograph of the titanium oxide compound of Example 2-2.

As clear from comparison between Examples 2-1 to 2-4 and Comparative Example 2-1, if the content of silicon in the titanate compound is 0.15 mass % or more, the initial charge/discharge efficiency can be approximately 88% or higher so that the initial charge/discharge efficiency is improved. The reason of this is considered that general bronze-type titanium oxide (e.g., Comparative Example 2-1) has needle crystals, while if the content of silicon is 0.15 mass % or more like Examples 2-1 to 2-4, the crystals become plate-like crystals. In other words, the average aspect ratio of the primary particles decreases, and the specific surface area is decreased due to a difference of crystal shape so that reaction with the electrolytic solution can be suppressed. As a result, the initial charge/discharge efficiency is improved. Note that a scanning electron micrograph of the titanium oxide compound of Example 2-2 is shown in FIG. 5B.

In addition, as clear from comparison between Example 2-4 and Comparative Example 2-2, if the content of silicon is 0.55 mass % or less, the initial discharge capacity can be approximately 186 mAh/g or higher and the initial charge capacity can be approximately 204 mAh/g or higher, so that the initial discharge capacity and the initial charge capacity can be prevented from being decreased. The reason of this is considered that if the content of silicon is more than 0.55 mass %, bad influence to a crystal phase is increased, and as a result, the initial discharge capacity and the initial charge capacity are decreased.

It is preferred that the content of silicon be 0.2 to 0.5 mass % inclusive. In this way, the initial charge/discharge efficiency can be 90% or higher, and a decrease of the initial discharge capacity can be substantially suppressed.

<Third Embodiment>

(Outline)

A titanium oxide compound according to a third embodiment of the present invention is bronze-type titanium oxide or titanium oxide mainly composed of bronze-type titanium oxide, and contains 0.005 to 1.2 mass % inclusive of calcium and 0.15 to 0.2 mass % inclusive of silicon, or contains 0.005 to 0.1 mass % inclusive of calcium and 0.15 to 0.5 mass % inclusive of silicon. As the titanium oxide mainly composed of bronze-type titanium oxide, there is, for example, titanium oxide that is mainly composed of bronze-type titanium oxide and contains a very small quantity of anatase type, rutile type, or hydrous titanium oxide. If the bronze-type titanium oxide is contained at 60 mass % or more, the titanium oxide compound having similar effect can be obtained, but it is more preferred that the bronze-type titanium oxide is contained at 80 mass % or more, and it is still more preferred that the bronze-type titanium oxide is contained at 90 mass % or more.

(Example of Manufacturing Method)

The manufacturing method is similar to that of the first embodiment and the second embodiment, and hence description thereof is omitted.

(Application to Lithium Ion Secondary Battery)

The application to the lithium ion secondary battery is similar to that of the first embodiment and the second embodiment, and hence description thereof is omitted. Note that if not a carbon material but the negative electrode material according to this embodiment (the above-mentioned titanium oxide compound according to this embodiment) is used for the negative electrode 12 of the lithium ion secondary battery 10, the same effect as in the case where the negative electrode material according to the first embodiment and the second embodiment is used can be obtained.

Hereinafter, Examples of this embodiment are described in more detail, but this embodiment is not limited to the Examples described below. In other words, it is needless to say that a part to which a known general method can apply, such as various process methods described below and a milling method, can be appropriately changed without limited to the Examples described below.

Comparative Example 3-1

Except that 26.2 weight parts of titanium oxide containing 0.1 mass % of silicon and 3.94 weight parts of calcium carbonate are mixed to 100 weight parts of water, and the mixture was stirred for 30 minutes, the same process as Example 1-3 was used so as to synthesize the titanium oxide compound.

The content of calcium in the obtained titanium oxide compound was 1.15 mass % as a result of the inductively coupled plasma emission spectro-photometric analysis. The content of silicon in the obtained titanium oxide compound was 0.02 mass % as a result of the inductively coupled plasma emission spectro-photometric analysis.

In addition, the average aspect ratio of the primary particles of the obtained titanium oxide compound was 3.52, the average pore diameter was 34 μm, the BET specific surface area was 7.03 m$^2$/g, and the pore volume was 0.059 cm$^3$/g. In addition, the X-ray diffraction spectrum (X-ray source: Cu—Kα) of the obtained titanium oxide compound was that indicating bronze-type titanium oxide having the tunnel structure.

EXAMPLE 3-1

Except that 26.2 weight parts of titanium oxide 3.94 weight parts of calcium carbonate, and 1.58 weight parts of silicon dioxide are mixed to 100 weight parts of water, and the mixture was stirred for 30 minutes, the same process as Comparative Example 3-1 was used so as to synthesize the titanium oxide compound.

The content of calcium in the obtained titanium oxide compound was 1.050 mass % as a result of the inductively coupled plasma emission spectro-photometric analysis. The content of silicon in the obtained titanium oxide compound was 0.19 mass % as a result of the inductively coupled plasma emission spectro-photometric analysis.

In addition, the average aspect ratio of the primary particles of the obtained titanium oxide compound was 2.85, the average pore diameter was 39 µm, the BET specific surface area was 2.05 m$^2$/g, and the pore volume was 0.020 cm$^3$/g. In addition, the X-ray diffraction spectrum (X-ray source: Cu—Kα) of the obtained titanium oxide compound was that indicating bronze-type titanium oxide having the tunnel structure.

Comparative Example 3-2

Except that 26.2 weight parts of titanium oxide containing 0.003 mass % of calcium and 4.93 weight parts of silicon dioxide were mixed to 100 weight parts of water, and the mixture was stirred for 30 minutes, the same process as Comparative Example 3-1 was used so as to synthesize the titanium oxide compound.

The content of calcium in the obtained titanium oxide compound was 0.003 mass % as a result of the inductively coupled plasma emission spectro-photometric analysis. The content of silicon in the obtained titanium oxide compound was 0.46 mass % as a result of the inductively coupled plasma emission spectro-photometric analysis.

In addition, the average aspect ratio of the primary particles of the obtained titanium oxide compound was 2.64, the average pore diameter was 39 µm, the BET specific surface area was 2.25 m$^2$/g, and the pore volume was 0.022 cm$^3$/g. In addition, the X-ray diffraction spectrum (X-ray source: Cu—Kα) of the obtained titanium oxide compound was that indicating bronze-type titanium oxide having the tunnel structure.

EXAMPLE 3-2

Except that 26.2 weight parts of titanium oxide, 1.58 weight parts of calcium carbonate, and 4.93 weight parts of silicon dioxide were mixed to 100 weight parts of water, and the mixture was stirred for 30 minutes, the same process as Comparative Example 3-1 was used so as to synthesize the titanium oxide compound.

The content of calcium in the obtained titanium oxide compound was 0.045 mass % as a result of the inductively coupled plasma emission spectro-photometric analysis. The content of silicon in the obtained titanium oxide compound was 0.46 mass % as a result of the inductively coupled plasma emission spectro-photometric analysis.

In addition, the average aspect ratio of the primary particles of the obtained titanium oxide compound was 2.34, the average pore diameter was 32 µm, the BET specific surface area was 2.03 m$^2$/g, and the pore volume was 0.016 cm$^3$/g. In addition, the X-ray diffraction spectrum (X-ray source: Cu—Kα) of the obtained titanium oxide compound was that indicating bronze-type titanium oxide having the tunnel structure.

Comparative Example 3-3

Except that 26.2 weight parts of titanium oxide, 3.94 weight parts of calcium carbonate, and 4.93 weight parts of silicon dioxide are mixed to 100 weight parts of water, and the mixture was stirred for 30 minutes, the same process as Comparative Example 3-1 was used so as to synthesize the titanium oxide compound.

The content of calcium in the obtained titanium oxide compound was 0.910 mass % as a result of the inductively coupled plasma emission spectro-photometric analysis. The content of silicon in the obtained titanium oxide compound was 0.42 mass % as a result of the inductively coupled plasma emission spectro-photometric analysis.

In addition, the average aspect ratio of the primary particles of the obtained titanium oxide compound was 2.04, the average pore diameter was 28 µm, the BET specific surface area was 1.98 m$^2$/g, and the pore volume was 0.014 cm$^3$/g. In addition, the X-ray diffraction spectrum (X-ray source: Cu—Kα) of the obtained titanium oxide compound was that indicating bronze-type titanium oxide having the tunnel structure.

(Analyzing Apparatus)

The analyzing apparatuses used in Examples 3-1 to 3-2 and Comparative Examples 3-1 to 3-3 were the same as those in the first embodiment and the second embodiment, and hence description thereof is omitted.

(Manufacturing of Electrodes)

Electrodes were manufactured similarly to the first embodiment and the second embodiment, and hence description thereof is omitted.

(Battery Evaluation Method) The battery evaluation method was the same as in the first embodiment and the second embodiment, and hence description thereof is omitted.

(Evaluation Result of Examples and Comparative Example)

FIG. 6 is a table showing a list of evaluation results of Examples 3-1 to 3-2 and Comparative Examples 3-1 to 3-3 of this embodiment.

As clear from comparison among Comparative Example 3-1, Example 3-1, and Comparative Example 3-3, if the content of calcium is 0.005 to 1.2 mass % inclusive and the content of silicon is 0.15 to 0.2 mass % inclusive in the titanate compound, the initial charge capacity and the initial discharge capacity can be respectively improved to approximately 191 mAh/g or higher and approximately 210 mAh/g or higher, while maintaining the initial charge/discharge efficiency to be approximately 91% or higher, due to synergistic effect of calcium and silicon.

As clear from comparison among Comparative Example 3-2, Example 3-2, and Comparative Example 3-3, if the content of calcium is 0.005 to 0.1 mass % inclusive and the content of silicon is 0.15 to 0.5 mass % inclusive in titanate compound, the initial charge capacity and the initial discharge capacity can be respectively improved to approximately 192 mAh/g or higher and approximately 211 mAh/g or higher, while maintaining the initial charge/discharge efficiency to be approximately 91% or higher, due to synergistic effect of calcium and silicon.

<Others>

It is considered that the calcium and silicon contained in the titanium oxide compound according to first to third embodiments of the present invention do not all exist on crystal surfaces of the titanium oxide compound, but at least a part of them exist as a solid solution inside the crystals of the titanium oxide compound. The reason of this is as follows. The potassium tetratitanate samples as intermediates synthesized in Comparative Example 1-1, Example 1-3, Example 2-2, and Example 3-1 were made to undergo X-ray diffraction measurement using the Cu—Kα ray source with the X-ray diffraction apparatus (Ultima4 of Rigaku Corporation). As shown in FIG. 7, when content of calcium or silicon increases, a change in surface spacing of potassium tetratitanate is observed. For instance, it is observed that there is no change in spacing of −313 surface of the potassium tetratitanate, but spacing of 200 surface is shortened. From this fact, it is estimated that these elements exist in crystals and affect the crystal surface spacing.

Although the first to third embodiments of the present invention are described above, the structure of the present invention is not limited to the embodiments and can be variously modified within the scope of the present invention without deviating from the spirit thereof. In other words, the first to third embodiments described above are merely examples in every aspect and should not be interpreted as a limitation. The technical scope of the present invention is defined by the claims and should be understood to include all modifications within meanings and ranges equivalent to the claims.

INDUSTRIAL APPLICABILITY

The titanium oxide compound according to the present invention can be used as an electrode active material that is used for an electrode of a lithium ion secondary battery, for example.

EXPLANATION OF NUMERALS 10 lithium ion secondary battery
11 positive electrode
12 negative electrode
13, 23 nonaqueous electrolyte
14, 24 separator
20 coin cell
21 electrode
22 opposite electrode
25a, 25b upper case, lower case
26 gasket

The invention claimed is:

1. A titanium oxide compound comprising bronze-type titanium oxide or titanium oxide mainly composed of bronze-type titanium oxide, wherein the titanium oxide contains 0.15 to 0.55 mass % inclusive of silicon.

2. The titanium oxide compound according to claim 1, wherein at least a part of the silicon exists as a solid solution in titanium oxide crystals.

3. The titanium oxide compound according to claim 1, wherein pore volume of the titanium oxide compound is 0.01 to 0.5 mL/g, and specific surface area thereof is 1.0 to 20 $m^2/g$.

4. An electrode using the titanium oxide compound according to claim 1 as electrode active material.

5. A lithium ion secondary battery using the electrode according to claim 4 as positive electrode or negative electrode.

6. A titanium oxide compound comprising bronze-type titanium oxide or titanium oxide mainly composed of bronze-type titanium oxide, wherein the titanium oxide contains 0.005 to 1.2 mass % inclusive of calcium and 0.15 to 0.2 mass % inclusive of silicon, or contains 0.005 to 0.1 mass % inclusive of calcium and 0.15 to 0.5 mass % inclusive of silicon.

7. The titanium oxide compound according to claim 6, wherein at least a part of the calcium and/or at least a part of the silicon exists as a solid solution in titanium oxide crystals.

8. The titanium oxide compound according to claim 6, wherein pore volume of the titanium oxide compound is 0.01 to 0.5 mL/g, and specific surface area thereof is 1.0 to 20 $m^2/g$.

9. An electrode using the titanium oxide compound according to claim 6 as electrode active material.

10. A lithium ion secondary battery using the electrode according to claim 9 as positive electrode or negative electrode.

* * * * *